March 20, 1928.
H. BROWN ET AL
AIR VENTING VALVE
Filed July 11, 1925
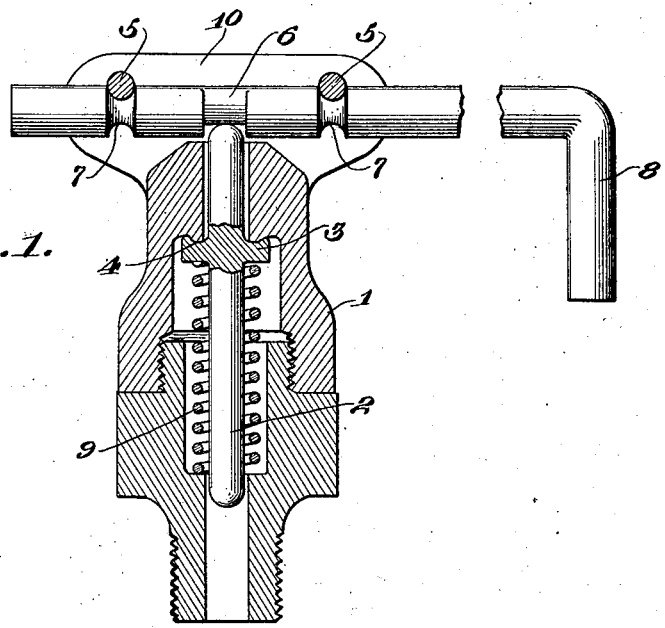
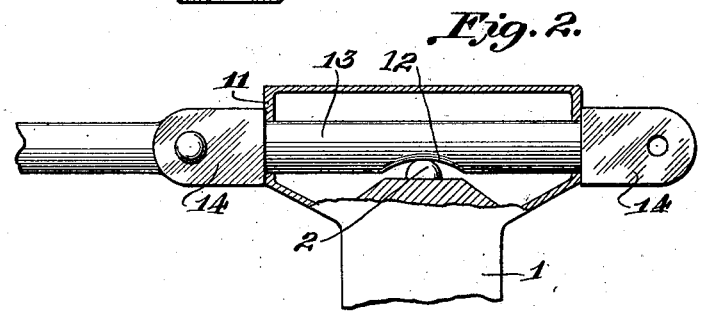
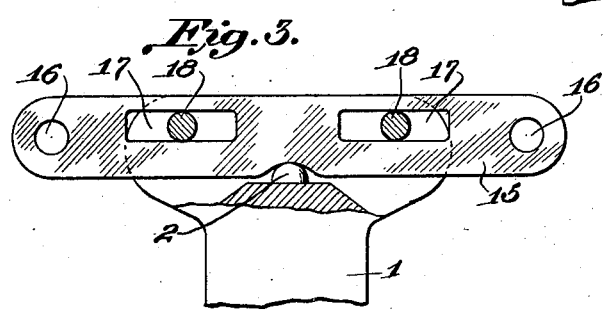
Inventor
Harold Brown, and
George Rudolph Uhl.

Patented Mar. 20, 1928.

1,663,157

UNITED STATES PATENT OFFICE.

HAROLD BROWN, OF KANSAS CITY, AND GEORGE RUDOLPH UHL, OF TONGONOXIE, KANSAS, ASSIGNORS TO THE MID-CONTINENT EQUIPMENT AND SUPPLY COMPANY, A CORPORATION OF KANSAS.

AIR-VENTING VALVE.

Application filed July 11, 1925. Serial No. 42,973.

This invention relates to an improved air release for auxiliary reservoirs, particularly adapted for the auxiliary reservoirs of the air brakes now used on railroad cars. Obviously, however, this invention may be used on other auxiliary reservoirs of suitable type without departing in any manner from the spirit of this invention. At the present time, in the case of bleeding air brake auxiliary reservoirs, it is common practice to bleed the reservoir or car before cutting loose from the engine in switching, for instance. To accomplish this, a member of the train crew pulls a lever and holds it for a minute and a half or more for each car switched. One of the principal objects of this invention is to provide mechanical means for holding the air release in exhaust position, thereby saving the time of the train crew, and materially expediting the work of train switching.

In the drawings,

Fig. 1 illustrates an elevation showing one modification of this invention in assembled form, with the valve in section showing the construction of an ordinary release valve in combination with a lever and cam actuating mechanism of the revolving type.

Fig. 2 represents a top view of the air valve showing a modified form of the air releasing mechanism as disclosed in Fig. 1.

Fig. 3 illustrates a top view of the air valve disclosing in combination therewith a modified form of lever and cam air release mechanism, of the pulling type.

Similar numerals in the different views represent the same element.

Numeral 1 designates the housing of the ordinary air auxiliary reservoir for brakes, commonly used, for instance, on railroad cars, while numeral 2 represents the valve piston, and 3 the seat, held in tension by spring 9, the valve being shown in Fig. 1 in closed relation as at 4.

In order to release the air by depressing the piston, a lever arm 8 is provided having circular grooves 7 at predetermined intervals, adapted to lock in sliding relation with rods 5 connected to suitable projecting portions 10 of housing 1. A groove 6 is located in the rod and is adapted to receive the release piston whenever the valve is closed, as clearly shown in the drawings. The groove 6 is cut in the rod 8 to give the effect of a cam motion whenever the rod is turned, thereby depressing the piston and releasing the air on revolving the rod 8. Obviously, the air piston 2 will remain as long as desired in released position, or set without further attention of the operator, until it is desired to close the valve.

A modified form of this invention is shown in Fig. 2, in which numeral 11 designates a support for the rod 13, and 14 the stop lugs for guiding the revolving motion of the rod, which tends to depress the piston 2 as it slides out of the groove 12, thereby releasing the air through the valve 1.

Another modification of this invention is disclosed in Fig. 3 in which the rod 15 is adapted to slide in slots 17, guided by pins 18, thereby causing the piston head 2 to slide out the groove in the rod, and depress the valve seat 3, causing a release of air. Numerals 16 represents attaching points for the sliding rod 15.

This invention is inexpensive to make, and simple of operation, as applied to the air release for the auxiliary reservoir of air brakes now used on railroad cars it is highly efficient. The present practice, when cutting a car loose from an engine, is to pull a lever and hold it until the air is released. This invention makes it possible to release the air valve by a simple turn or pull of a rod, at the same time setting the device at the release position, thereby enabling one operator to walk down a string of cars and bleed them in the same time that one could be bled in the old way. Obviously, valuable time of the whole train crew would be saved.

What we claim is:—

An air brake auxiliary reservoir casing having a guide bore at one end thereof, a piston valve reciprocable in said casing to control the release of air therefrom and having a guide stem longer than and slidable in said bore, a spring in said casing to maintain the piston valve normally closed with the stem thereof normally projecting endwise from said bore, and a rod rotatably mounted on said casing and having a cam part in slidable engagement with the projecting end of said stem and operable by the rotation of said rod to control the opening and closing of said valve.

In testimony whereof we affix our signatures.

HAROLD BROWN.
GEORGE RUDOLPH UHL.